Sept. 4, 1945.  A. LYSHOLM  2,383,980
VARIABLE SPEED POWER TRANSMISSION
Filed April 25, 1942  2 Sheets-Sheet 1
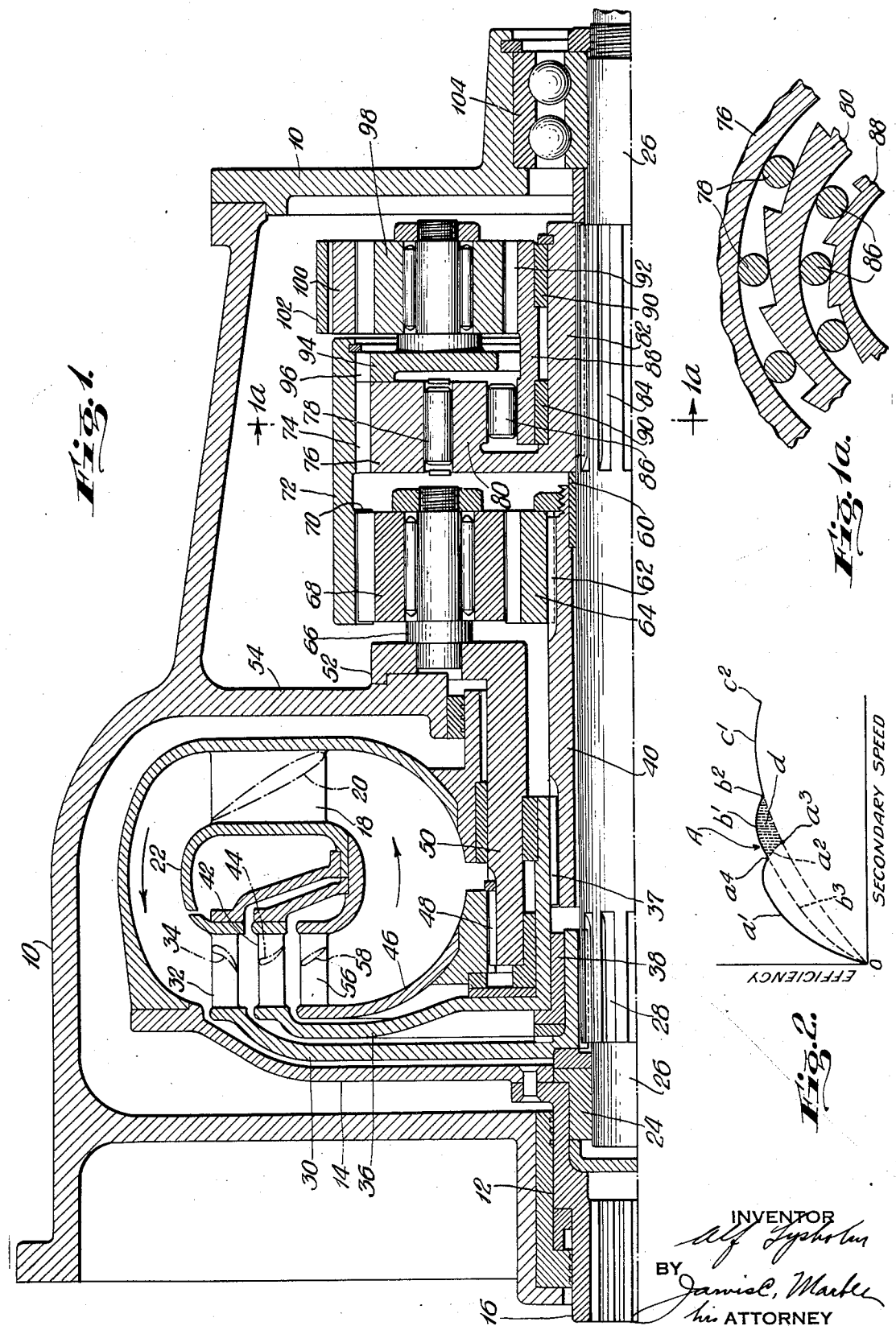

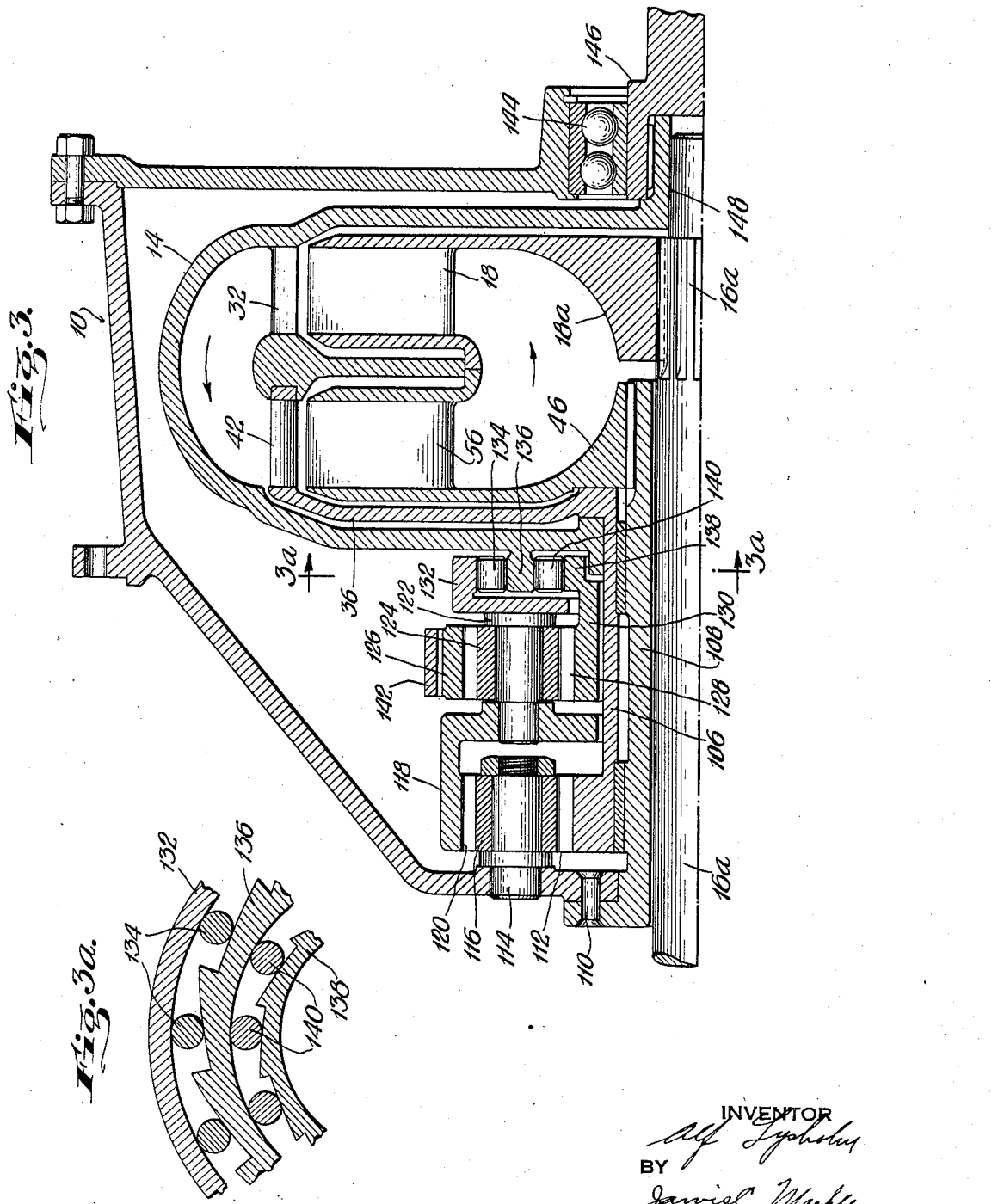

Patented Sept. 4, 1945

2,383,980

UNITED STATES PATENT OFFICE 2,383,980

VARIABLE-SPEED POWER TRANSMISSION

Alf Lysholm, Stockholm, Sweden, assignor, by mesne assignments, to Jarvis C. Marble, New York, N. Y., Leslie M. Merrill, Westfield, N. J., and Percy H. Batten, Racine, Wis., as trustees Application April 25, 1942, Serial No. 440,425

19 Claims. (Cl. 74—189.5)

The present invention relates to variable speed transmissions and has particular reference to variable speed transmissions of the kind embodying a hydraulic torque converter. More particularly, the invention relates to hydraulic torque converter transmissions of the kind adapted to provide efficient power transmission for vehicle and other like types of drives where there is a very wide variation in driven shaft speed.

In order to provide for relatively high torque multiplication and efficient operation at low driven shaft speeds, while maintaining efficiency of operation over a wide speed range of driven shaft operation, I have heretofore proposed in my copending application Serial No. 385,047, filed March 25, 1941 (now matured into Patent No. 2,292,384, granted August 11, 1942), an arrangement embodying a converter of the kind in which two oppositely rotating turbine wheels are employed which are effective in the lower speed range of driven shaft speed, and in which the reversely or counter-rotating turbine wheel becomes ineffective in the higher portion of the range of driven shaft speeds. In this general arrangement the converter operates as a double rotation device in the low speed range and as a single rotation converter in the higher speed range. I have also proposed making the range of operation in which the converter functions as a single rotation converter the intermediate operating range for the driven shaft, with the final or high speed operating range effected either by means of directly connecting the driving and driven shafts to provide a mechanical drive, or by causing the operation of the hydraulic device to shift over to fluid coupling operation by means of the use of releasable guide or reaction blades.

The present invention has for its general object the provision of an improved arrangement for securing a wide speed range of operation of the driven shaft, with relatively simple and compact mechanism, which will permit a higher driven shaft speed variation to be obtained with higher overall hydraulic efficiency, and without resorting to mechanical direct drive or coupling drive, than in the arrangements heretofore proposed.

In accordance with the present invention a double rotation type of converter is employed with which there is associated with at least one of the rows of turbine blading a gear which may be operated to alter the speed ratio between the turbine blading, with which the gear is associated, and the driven shaft, to alter the characteristics of the double rotation phase of operation of the transmission; this general arrangement being coupled with means whereby in the highest range of speed of torque converter operation the apparatus will function as a single rotation converter. While gearing of the nature proposed may be applied to either or both the forwardly and counter-rotating turbine blading of the converter, it is preferable to utilize such gearing in connection with the counter-rotating blading, since if such gearing is applied to the forwardly rotating blading most satisfactory results would probably be obtained only if the gearing were applied to both. Since satisfactory results can be obtained by utilization of a single gear if the gear is applied to the counter-rotating blading, this arrangement is considered to be the more preferable and the invention will therefore be hereinafter described in connection with this specific form by way of example. It will be understood, however, that the invention is not limited to the form of the illustrative examples.

In the drawings, forming a part hereof,

Fig. 1 is a more or less diagrammatic longitudinal central half section of a transmission embodying the principles of the invention;

Fig. 1a is a fragmentary section taken on line 1a—1a of Fig. 1;

Fig. 2 is a diagram showing efficiency of operation at various secondary shaft speeds;

Fig. 3 is a section similar to Fig. 1, showing another form of transmission embodying the principles of the invention; and Fig. 3a is a fragmentary section taken on line 3a—3a of Fig. 3.

Referring now more particularly to Fig. 1 of the drawings, numeral 10 designates a rotationally fixed or stationary casing, adapted for example to be secured to an engine. At one end casing 10 provides a bearing 12 for supporting one end of a rotating casing member 14, the end 16 of which provides a primary or driving shaft part for connection to a power input shaft. The rotating casing 14 carries a ring of pump blades 18, the section and inclination of which are indicated by the dot-and-dash line 20, the axially inner ends of the blades being attached to an internal ring or torus member 22.

The rotating casing 14 is provided with an internal bearing 24 supporting the inner end of the driven or secondary shaft 26 which is co-axial with the driving shaft. Fixed to the driven shaft 26 as by means of splines 28 is the first or forwardly rotating turbine wheel 30. This wheel carries a ring of turbine blades 32, the profile and inclination of which is indicated by the dot-and-dash line 34.

The oppositely rotating or counter-rotation turbine wheel 36 is carried by bearing 38 on the hub portion of the forwarding rotating turbine wheel 30. The hub portion of wheel 36 is connected by means of splines or the like 37 to a sleeve member 40 around shaft 26. Wheel 36 carries a ring of turbine blades 42 the profile and inclination of which is shown by the dot-and-dash line 44.

A guide or reaction blade wheel 46 is fixed by means of splines or the like 48 to a sleeve member 50 having a flanged end portion 52 rigidly secured to the stationary web 54 forming a part of the outer casing 10. Wheel 46 carries a ring of guide blades 56 the profile and inclination of which is indicated by the dot-and-dash line 58.

One end of the sleeve member 40 is carried by means of bearing 60 on the driven shaft and has formed integral thereon, or otherwise fixedly secured as by means of splines 62, the sun gear 64 of a gear train comprising this sun-gear, pinions 68 meshing therewith and an internal ring gear 70. The pinions 68 are mounted on a carrier 66 which is secured to the stationary flanged portion 52. The internal ring gear 70 is formed on a rotatable gear member 72, the other end of which is splined as at 74 to the outer ring member 76 of a freewheel or overrunning clutch having rollers 78 engaging an inner clutch member 80. The member 80 has a hub portion 82 fixed to the driven shaft 26 as by means of splines 84.

The member 80 in addition to forming the inner ring coacting with the freewheel clutch rollers 78 also forms the outer ring of a second freewheel clutch having rollers 86. The inner ring of this second freewheel clutch is formed by a sleeve member 88 rotatably mounted by means of bearings 90 on the hub portion 82 of member 80. One end of the sleeve member 88 is provided with gear teeth forming the sun gear 92 of a planetary gear. The planet carrier 94 of this gear is fixed as by means of splines 96 to one end of the gear member 72. Carrier 94 carries a plurality of planets, one of which is shown at 98, which mesh with the sun gear 92 and the internal teeth of ring gear 100. The outer face of the ring gear 100 is in the form of a brake drum arranged to be frictionally engaged by the selectively operable brake band 102 to anchor the gear or permit it to freely rotate. The band 102 may be contracted by any suitable form of actuating mechanism which is so well known in the art that it needs no description herein. Actuation of the brake band may be either manually or automatic in response to any given set of conditions of operation, as desired.

The rear end of the driven shaft, the forward end of which is supported by bearing 24, is carried by the bearing 104 located in a suitable extension of the stationary casing 10.

The operation of the apparatus above described is as follows: The blading indicated is for right-hand or clockwise rotation of the driving and driven shafts, looking at the apparatus from the driving toward the driven end. The working chamber in which the pump, turbine and guide blades are located is filled with suitable working liquid and clockwise rotation of the pump wheel results in circulation of the fluid in a closed path of flow through the pump and other blades in the direction denoted by the arrows in the figure. This flow results in rotation of the first or forward turbine wheel in the same direction as that of the pump wheel and rotation of the second or counter-rotation turbine wheel in a direction counter to that of the pump and the first turbine wheel. After passing through the second turbine stage the fluid preferably passes, as in the arrangement shown, through a stage of stationary guide blades located in the circuit ahead of the pump wheel. This location and arrangement of guide blades are ordinarily desirable in order to prevent the torque absorbing power of the pump wheel from falling off as the speeds of the turbine wheels increase upon acceleration of the driven shaft. If the reversely rotating blades of the counter-rotation wheel were to discharge directly to the pump wheel the change in inlet angle of the fluid flowing to the pump wheel as the turbine blade speed increases would undesirably reduce the torque absorbing capacity of the pump and prevent the pump from absorbing the full power of the engine in the higher speed range of the driven shaft.

The hydraulic efficiency of the apparatus is a function of the sum of the squares of the turbine blade speeds and since the speed which controls this relation is relative blade speed, the sum of the squares of the blade speeds increases relatively rapidly as the driven shaft speed increases from stall or zero speed. This is due to the fact that the two sets of turbine wheels are both rotating but in opposite directions. Consequently the relative speed between them increases very much more rapidly than in the case of a single rotation converter. Because of this characteristic the curve of hydraulic efficiency, which in Fig. 2 is plotted against secondary or driven shaft speed, rises very rapidly as indicated by the portion $a^1$ of the efficiency curve A.

Referring again to Fig. 1, it will be seen that the forward running turbine wheel 30 transmits its power directly to and rotates at the same speed as the driven shaft. The counter-rotating turbine wheel 36 transmits its power through the sleeve member 40 and the gears 64, 68 and 70 to the annular gear member 72, the direction of rotation being reversed by these gears so that the member 72 rotates in the same direction as the driven shaft 26. From the gear member 72 drive is transmitted to the driven shaft through the overrunning clutch rollers 78 to member 80 which is fixed to the driven shaft. In connection with this form of drive it is to be noted that due to the gear ratio of the train comprising gears 64, 68 and 70 the counter-rotating turbine wheel is caused to rotate at a higher rate of speed than the driven shaft. In the embodiment illustrated this ratio is approximately 2:1. Consequently in the example shown the relative rotational speed between the forward and the counter-rotating turbine wheels is three times the speed, for any given driven shaft speed, that would be developed between a single turbine wheel and a set of stationary guide blades. This therefore results in a very rapid increase in the sum of the square of the blade speeds when increase in driven shaft speed occurs.

It will be apparent that by a suitably chosen gear ratio produced by the gearing, the speed relation between the counter-rotating turbine and the driven shaft may be varied considerably, to change the value of the sum of the squares of the blade speeds corresponding to a given driven shaft speed and alter the steepness of the efficiency curve as the driven shaft is accelerated from stall.

As the speeds of the oppositely rotating turbine wheels increase upon increase in driven shaft speed the relative inlet angle of the fluid delivered to the counter-rotating wheel will progressively change and when a certain speed, determined by the outlet angle of the forwardly rotating turbine blades, is reached, the relative inlet angle of flow to the counter-rotating blades will change to a direction such that the liquid will flow through the blade row without deflection and without doing any work. If this speed is exceeded the further change in relative inlet angle will cause the liquid to be deflected by the rear faces of the counter-rotating blades, tending to make the counter-rotating wheel reverse its direction of rotation. When a speed is reached at which work is no longer done by the counter-rotating wheel, this wheel is permitted to float by the action of the overrunning or freewheel clutch rollers 78, the member 80 under such conditions continuing to rotate at driven shaft speed under the power developed by the forwardly rotating turbine wheel and the outer clutch member 76 slowing down, coming to rest, or even turning in the opposite direction, depending upon the hydraulic forces acting on the turbine blades of the counter-rotation wheel.

Because of the high relative blade speeds developed in a double rotation converter at relatively low driven shaft speeds, the efficiency curve not only rises rapidly from zero, as previously described, but also passes the point of peak efficiency and commences to drop while the driven shaft is still turning at relatively low speed. This is particularly true if one or both of the turbine wheels is geared to rotate at a speed higher than driven shaft speed, although such gearing is desirable in order to secure a relatively very rapid rise in the efficiency curve from zero. With such an arrangement the efficiency curve of double rotation operation will drop off relatively rapidly as indicated by the dotted line portion $a^2$ of the curve of Fig. 2. Assuming for the moment that this has been permitted to occur and that the efficiency has dropped to the point $a^3$ at the time when the counter-rotating wheel ceases to do useful work, further rise in driven shaft speed then results in single rotation operation of the converter, which produces a very much more extended or flatter efficiency curve than double rotation operation. The efficiency of operation during the single rotation phase is indicated by the portion $c^1$ of the curve.

It will be evident from inspection of Fig. 2 that an efficiency curve made up of portions $a^1$, $a^2$ and $c^1$ will be undesirable, assuming for example that the point $c^2$ represents the normal maximum speed at which the converter is intended to drive the driven shaft. With this type of efficiency curve there will exist in about the middle of the acceleration range a zone of relatively inefficient power transmission, which will result in what is generally referred to as a "flat spot" in the accelerating characteristics of the vehicle or other mechanism driven through the converter.

In accordance with the present invention all of the advantages of an efficient curve rising very rapidly from stall, together with the relatively wide range of high efficiency operation of a single rotation converter are secured without the loss of efficiency in an intermediate speed range which would ordinarily occur with operation as above described. This drop of efficiency in the intermediate range is accomplished in accordance with this invention by the planetary gearing, which is available as a speed changing device for altering the speed ratio between the driven shaft and at least one of the turbine wheels, which in this case is the preferred arrangement of speed change between the driven shaft and the counter-rotating turbine wheel.

To illustrate the manner in which the desired object is accomplished, let it be assumed that at a drive shaft speed corresponding to $a^4$ on the curve of Fig. 2 (which represents a still acceptably high efficiency) the brake band 102 is contracted to lock the planetary ring gear 100 against rotation. With the ring gear 100 free to rotate, under the previously described condition of drive, the planetary carrier 94 of the planetary gear has been rotating at the same speed as the gear member 72, but no power is transmitted through the planetary gearing due to the fact that the ring gear 100 is free to float. When this gear is locked against rotation the planet carrier 94 is continued to be rotated at the speed of the gear member 72, and the resulting rotation about their axes of the planets 98 rolling on the fixed gear 100 transmits the drive through the overrunning clutch rollers 86 to the member 80 fixed on the driven shaft. When the gear member 100 is free to float, the gear member 72 and the driven shaft revolve at the same speed. When the gear ring is locked and drive is transmitted through the planets 98, the driven shaft is forced to rotate at a speed higher than that of the gear member 72 by an amount determined by the relative diameters of the gears in the planetary gear system. In the example illustrated the over-speed of the driven shaft relative to the gear member 72 is approximately 3:1.

While for purpose of description the planetary gear system has been described as operating to overspeed the driven shaft, the actual practical effect of this gear is to reduce the speed of the counter-rotating turbine wheel relative to the driven shaft speed when the ring gear 100 is locked. The net result is that while the counter-rotating wheel turns at twice the speed of the forward rotating wheel when the gear 100 is free, it rotates at only approximately two-thirds of the speed of the forwardly rotating wheel when the gear 100 is locked. The effect of this is to sharply reduce the relative rotational turbine blade speed at a given shaft speed as compared with the conditions when the gear 100 is not locked. As a result of the lowering of the relative blade speed at a given driven shaft speed, the driven shaft speed can be further accelerated without producing excessive relative blade speed with consequent drop in efficiency, and the efficiency curve with the secondary planetary gearing in operation will be as shown in section $b^1$ of the curve of Fig. 2.

At the point $b^2$ the efficiency curve $b^1$ intersects the efficiency curve representative of single rotation operation and at that point the counter-rotating turbine wheel will, under the assumed conditions, cease to do useful work and in the higher speed range of the driven shaft the efficiency will follow the curve portion $c^1$. Due to the rise in the efficiency of single rotation operation between the points $a^3$ and $b^2$ the efficiency of operation during double rotation operation will never drop to as low a point as $a^3$ and the gain in efficiency will be represented by the hatched area $d$. Thus an overall high efficiency will be obtainable over an extremely wide speed range, with relatively high efficiency arrived at at a low driven shaft speed and with the efficiency maintained thereafter throughout the accelerating range at a relatively constant value.

In addition to this advantage, the arrangement provides a still further operating advantage. For vehicle drives many different operating conditions arise and if to meet certain operating conditions it is not necessary to have the efficiency curve follow the steep line represented by the portion of the curve $a^1$, the brake band 102 may be left contracted so as to lock the gear 100, in which event if the apparatus is accelerated from stall the efficiency curve will follow the line $b^3$, $b^1$, $c^1$. With the apparatus operated with the gear 100 locked there is then always available what may be termed an emergency setting in the low speed range which will operate upon release of the brake band 102 to throw the transmission over to a higher efficiency range with greater tractive effort available at very low driven shaft speeds.

The principles of the invention may be embodied in forms of apparatus of widely different design and may be applied to torque converters having widely different blading arrangements. As illustrative of this I have shown another form of apparatus in Fig. 3, in which pump blades 18, instead of being formed in the rotating casing 14, are carried by a rotatably mounted pump wheel 18a fixed to the driving shaft 16a. The first or forwardly rotating turbine blades 32 are in this instance carried by the rotating casing 14 and the oppositely or counter-rotating blades 42 are carried by a turbine wheel 36, the sleeve-like hub portion 106 of which is mounted around the hollow sleeve 108 to which the guide blade wheel 46, carrying guide blades 56, is secured. The sleeve 108 is held against rotation by suitably fixing the flanged end 110 thereof to the rotationally stationary casing 10.

The sleeve 106 of the counter-rotating turbine wheel 36 is provided with a gear 112 forming the sun gear of a gear train having a pinion carrier 114 carrying a plurality of pinions 116 which mesh with the sun gear and with a gear member 118 providing a ring gear 120. The member 118 also carries the planet carrier 122 of a planetary gearing having planets 124 meshing with a floating ring gear 126 and with a sun gear 128 formed on a second gear member 130. A portion of the gear member 118 also provides the outer ring member 132 of an overrunning clutch having rollers 134 which engage the outer surface of an annular flange 136 on the rotating casing 14. This flange forms the inner member of the overrunning clutch. Similarly, gear member 130 is provided with a portion 138 forming the inner member of a second overrunning clutch comprising rollers 140 for which the portion 136 of the rotating housing 14 forms the outer clutch member.

A band brake 142 with suitable mechanism for contracting it is provided in order to selectively lock the floating ring gear 126 against rotation.

As will be seen from the drawings, the rotating housing 14 is journalled at one end on the hollow hub shaft 106 and at its other end is carried by a bearing 144 mounted in the stationary casing. The rotating casing is extended integrally or by means of a shaft member fixed thereto to form the driven or secondary member 146 and the rearward end of the driving shaft 16a is advantageously carried by a bearing 148 in the hub portion of the rotating casing 14.

Functionally the arrangement shown in Fig. 3 operates essentially as does the arrangement previously described in connection with Fig. 1, although the arrangement of the parts is very different and one set of the turbine blades, instead of the pump blades, is carried by the rotating casing 14, which in this instance performs the dual function of providing both the forwardly rotating turbine wheel and the driven or secondary member of the transmission. Upon rotation of the pump wheel 18a in the proper direction the turbine blades 32 and 42 rotate in forward and counter-rotation directions, respectively, power being transmitted to the casing 14 directly from blades 32. Power from the counter-rotating blades is transmitted to the blade wheel and through the gearing comprising the pinions 116 to the gear member 118, the direction of rotation being reversed by this gearing. The power is then transmitted from the overrunning clutch part 132 forming a part of member 118, through the overrunning clutch rollers 134 to the part 136 of the rotating housing 14. The above transmission of power is based on the assumption that the floating ring gear 126 is released and free to revolve. If now this gear is held stationary by the brake 142, power from the gear member 118 is transmitted through the planets 124 and sun gear 128 to the member 130. From this member power is transmitted through the overrunning clutch rollers 140 to the rotating housing 14.

As will be apparent from the drawing, the gear comprising pinions 116 will operate as in the previously described embodiment to cause the counter-rotating blades to rotate at greater speed than the speed of the driven shaft when the planetary gear comprising planets 124 is not in use. When the latter is brought into action the speed of the counter-rotating blades relative to the driven shaft speed is reduced as compared with the other condition of drive, in the same manner as described in connection with Fig. 1.

From the foregoing it will be apparent that many variations in the specific structures herein illustrated by way of example may be made without departing from the invention and that the apparatus may be combined with other apparatus of known kind and arrangement to afford, in addition to the above described types of drive, additional mechanical direct drive or fluid coupling drive. Since these expedients are already known, it is not believed necessary to describe the same further herein. The invention is therefore to be considered as embracing all form of apparatus within the scope of the appended claims.

What is claimed:

1. A variable speed power transmission comprising a hydraulic torque converter including a ring of forwardly rotating turbine blading and a ring of counter-rotating turbine blading, a driven member, means for connecting both the forwardly rotating and the counter-rotating rings of blading to said driven member, said means including gearing operative to reverse the direction of the drive from said ring of counter-rotating blading to said driven member and gear means selectively operable for altering the speed ratio at which at least one of said rings of turbine blading is connected to transmit power to said driven member.

2. A variable speed power transmission comprising a hydraulic torque converter including a ring of forwardly rotating turbine blading and a ring of counter-rotating turbine blading, a driven member, means for connecting both the forwardly rotating and the counter-rotating rings of blading to said driven member, said means including gearing operative to reverse the direction of the drive from said ring of counter-rotating blading to said driven member and gear means selectively operable to reduce the speed ratio at which at least one of said rings of blading is connected to transmit power to said driven member.

3. A variable speed power transmission comprising a hydraulic torque converter including a forwardly rotating ring of turbine blading and a counter-rotating ring of turbine blading, a driven member, means including gearing operative to reverse the direction of the drive from said counter-rotating blading for connecting said blading to said driven member and gear means selectively operable to alter the speed ratio through which said counter-rotating blading transmits power to said driven member.

4. A variable speed power transmission comprising a hydraulic torque converter including forwardly rotating turbine blading and counter-rotating turbine blading, a driven member, means including gearing operative to reverse the direction of the drive from said counter-rotating blading for connecting said blading to said driven member and gear means selectively operable to reduce the speed of said counter-rotating blading relative to said driven member.

5. A variable speed power transmission comprising a hydraulic torque converter including forwardly rotating turbine blading and counter-rotating turbine blading, a driven member, and means including gearing operative to reverse the direction of the drive from said counter-rotating turbine blading for connecting said blading to said driven member, said gearing including a gear train providing a step-up ratio from said driven member to said counter-rotating blading for causing said counter-rotating turbine blading to rotate at a higher speed than that of said driven member.

6. A variable speed power transmission comprising a hydraulic torque converter including forwardly rotating turbine blading and counter-rotating turbine blading, a driven member, means including a first gearing operative to reverse the direction of the drive from sand counter-rotating blading for connecting said blading to said driven shaft, said gearing including gears arranged to cause said counter-rotating turbine blading to rotate at a higher speed than that of said driven member, and gearing selectively operable to transmit power from said first gearing to said driven member to reduce the speed of said counter-rotating turbine blading relative to the driven member established by said first gearing.

7. A variable speed power transmission comprising a hydraulic torque converter including forwardly rotating turbine blading and counter-rotating turbine blading, a driven member, means for connecting said forwardly rotating blading to said driven member, means including a gear train for connecting said counter-rotating blading to said driven member, the last-mentioned means comprising a sun gear connected to the blading, a rotationally stationary pinion carrier, a ring gear member and a releasable clutch between said ring gear member and said driven member, and a second gearing operable to transmit power from said ring gear member to said driven member, said second gearing being selectively operable and constructed to decrease the speed of said ring gear member relative to said driven member.

8. A variable speed power transmission comprising a hydraulic torque converter including forwardly rotating turbine blading and counter-rotating turbine blading, a driven member, means for connecting said forwardly rotating blading to said driven member, means including a gear train for connecting said counter-rotating blading to said driven member, the last-mentioned means comprising a sun gear connected to the blading, a rotationally stationary pinion carrier, a ring gear member and a releasable clutch between said ring gear member and said driven member, a planetary gearing comprising a planet carrier fixed to rotate with said ring gear member, a sun gear and a ring gear, a releasable clutch for connecting the last mentioned sun gear to said driven member, and a releasable brake for selectively locking the last mentioned ring gear against rotation or permitting it to freely rotate.

9. A variable speed power transmission comprising a hydraulic torque converter having a rotating casing carrying pump blades, a forwardly rotating turbine wheel and a counter-rotating turbine wheel, a driven member, means including gearing operative to reverse the direction of the drive from said counter-rotating wheel for connecting both of said wheels to said driven member, and gear means selectively operable to reduce the speed ratio of at least one of said wheels with respect to said driven member.

10. A variable speed power transmission comprising a hydraulic torque converter having a rotating casing carrying pump blades, a forwardly rotating turbine wheel and a counter-rotating turbine wheel, a driven member, means including gearing operative to reverse the direction of the drive from said counter-rotating wheel for connecting both of said wheels to said driven member, and gear means selectively operable to reduce the speed ratio of said counter-rotating wheel with respect to said driven member.

11. A variable speed power transmission comprising a hydraulic torque converter including a rotating casing carrying pump blades, a forwardly rotating turbine wheel and a counter-rotating turbine wheel, a driven member, means including gearing operative to reverse the direction of the drive from said counter-rotating wheel for connecting said wheels to said driven member, said gearing including a gear train and an overrunning clutch for transmitting power from the counter-rotating turbine wheel to the driven member, a planetary gearing and a second overrunning clutch for transmitting power from said gear train to said driven member, said planetary gearing being selectively operable and arranged to reduce the speed of said counter-rotating turbine wheel relative to the driven member when the planetary gear is actuated.

12. A variable speed power transmission comprising a hydraulic torque converter including a rotating casing carrying pump blades, a forwardly rotating turbine wheel and a counter-rotating turbine wheel, a driven member, means for connecting said forwardly rotating wheel to said driven member, means including a gear train for connecting said counter-rotating wheel to said driven member, said means comprising a sun gear connected to said counter-rotating wheel, a rotationally stationary pinion carrier, a ring gear member and a releasable clutch between said ring gear member and said driven member, and a second gearing operable to transmit power from said ring gear member to said driven member, said second gearing being selectively operable and constructed to decrease the speed of said ring gear member relative to said driven member.

13. A variable speed power transmission comprising a hydraulic torque converter including a rotating casing carrying pump blades, a forwardly rotating turbine wheel and a counter-rotating turbine wheel, a driven member, means for connecting said forwardly rotating wheel to said driven member, means including a gear train for connecting said counter-rotating wheel to said driven member, said means comprising a sun gear connected to said counter-rotating wheel, a rotationally stationary pinion carrier, a ring gear member and a releasable clutch between said ring gear member and said driven member, a planetary gearing comprising a planet carrier fixed to rotate with said ring gear member, a sun gear and a ring gear, a releasable clutch for connecting the last mentioned sun gear to said driven member, and a releasable brake for selectively locking the last mentioned ring gear against rotation or permitting it to freely rotate.

14. A variable speed power transmission comprising a hydraulic torque converter including a rotating casing carrying pump blades, a forwardly rotating turbine wheel, a counter-rotating turbine wheel, a driven member, means including a gear train constructed to reverse the direction of drive between said driven member and said counter-rotating wheel for transmitting power from both of said wheels to said driven member, and a planetary gearing selectively operable to alter the speed ratio between one of said wheels and said driven member.

15. A variable speed power transmission comprising a hydraulic torque converter including a rotating casing carrying pump blades, a forwardly rotating turbine wheel, a counter-rotating turbine wheel, a driven member, means including a gear train constructed to reverse the direction of drive between said driven member and said counter-rotating wheel for transmitting power from both of said wheels to said driven member, and a planetary gearing selectively operable to reduce the speed of said counter-rotating wheel relative to the speed of said driven member.

16. In a variable speed power transmission, a hydraulic torque converter comprising a rotating casing, a pump wheel mounted for rotation relative to said casing, turbine blading carried by said casing for rotation therewith, a counter-rotation turbine wheel carrying turbine blading constructed and arranged to rotate in a direction counter to that of said pump wheel and said casing, and gearing for transmitting power from said counter-rotating wheel to said casing, said gearing being constructed to reverse the direction of rotation of the drive from said counter-rotating wheel to said casing.

17. A variable speed power transmission comprising a hydraulic torque converter comprising a rotating casing, a pump wheel mounted for rotation relative to said casing, turbine blading carried by said casing for rotation therewith, a counter-rotation turbine wheel carrying turbine blading constructed and arranged to rotate in a direction counter to that of said pump wheel and said casing, gearing for transmitting power from said counter-rotating wheel to said casing, said gearing being constructed to reverse the direction of rotation of the drive from said counter rotating wheel to said casing, and a second and selectively operable gearing for transmitting power from said counter rotating wheel to said casing, said second gearing being arranged to reduce the speed of said counter-rotating wheel relative to that of said casing, as compared with the speed ratio therebetween established by the first mentioned gearing.

18. A variable speed power transmission comprising a hydraulic torque converter comprising a rotating casing, a pump wheel mounted for rotation relative to said casing, turbine blading carried by said casing for rotation therewith, a counter-rotation turbine wheel carrying turbine blading constructed and arranged to rotate in a direction counter to that of said pump wheel and said casing, means including a gear train for connecting said counter rotating wheel to said casing, said means comprising a sun gear connected to the counter-rotating wheel, a rotationally stationary pinion carrier, a ring gear member and a releasable clutch between said ring gear member and said casing, and a second gearing operable to transmit power from said ring gear member to said casing, said second gearing being selectively operable and constructed to decrease the speed of said ring gear member relative to said casing.

19. A variable speed power transmission comprising a hydraulic torque converter comprising a rotating casing, a pump wheel mounted for rotation relative to said casing, turbine blading carried by said casing for rotation therewith, a counter-rotation turbine wheel carrying turbine blading constructed and arranged to rotate in a direction counter to that of said pump wheel and said casing, means including a gear train for connecting said counter-rotating wheel to said casing, said means comprising a sun gear connected to the counter-rotating wheel, a rotationally stationary pinion carrier, a ring gear member and a releasable clutch between said ring gear member and said casing, a planetary gearing comprising a planet carrier fixed to rotate with said ring gear member, a sun gear and a ring gear, a releasable clutch for connecting the last mentioned sun gear to said driven member, and a releasable blade for selectively locking the last mentioned ring gear against rotation or permitting it to rotate freely.

ALF LYSHOLM.